United States Patent

Onodera

[11] Patent Number: 5,596,447
[45] Date of Patent: Jan. 21, 1997

[54] MAGNETOOPTICAL ELEMENT

[75] Inventor: Koichi Onodera, Miyagi, Japan

[73] Assignee: Tokin Corporation, Miyagi, Japan

[21] Appl. No.: 307,658

[22] PCT Filed: Jan. 25, 1994

[86] PCT No.: PCT/JP94/00095

§ 371 Date: Sep. 19, 1994

§ 102(e) Date: Sep. 19, 1994

[87] PCT Pub. No.: WO94/17437

PCT Pub. Date: Aug. 4, 1994

[30] Foreign Application Priority Data

| Jan. 25, 1993 | [JP] | Japan | 5-009984 |
| Jan. 25, 1993 | [JP] | Japan | 5-010000 |
| Nov. 11, 1993 | [JP] | Japan | 5-282217 |

[51] Int. Cl.$^6$ .................................. G02F 1/00
[52] U.S. Cl. ................... 359/324; 359/321; 359/257; 359/484; 359/497; 372/37
[58] Field of Search .................... 359/324, 280, 359/321, 257, 305, 497, 499, 484; 372/94, 26, 27, 37

[56] References Cited

U.S. PATENT DOCUMENTS

| 3,586,416 | 6/1971 | De Betetto | 359/320 |
| 3,947,089 | 3/1976 | Rapp | 359/305 |
| 4,933,629 | 6/1990 | Kozuka et al. | 359/257 |
| 4,988,170 | 1/1991 | Buhrer | 359/497 |
| 5,027,367 | 6/1991 | Rea, Jr. et al. | 372/94 |
| 5,043,996 | 8/1991 | Nilsson et al. | 372/94 |

FOREIGN PATENT DOCUMENTS

| 61-123814 | 6/1986 | Japan. |
| 3-229217 | 10/1991 | Japan. |

OTHER PUBLICATIONS

Japanese Journal of Applied Physics vol. 30 No. 2A Part 02 (Jan. 2, 1991) pp. L198–L201.
Japanese Citation (Onodera and Oikawa) The 15th Scientific Lecture Proceedings of the Applied Magnetism Institute of Japan (p. 179)–1991.

Primary Examiner—Loha Ben
Attorney, Agent, or Firm— Hopgood, Calimafde, Kalil & Judlowe

[57] ABSTRACT

In a magnetooptical element comprising a single crystal of $Cd_{1-x-y}Mn_xHg_yTe$, the single crystal has a composition in an area defined in a quasi three-element phase diagram of MnTe—HgTe—CdTe by four points of:
$Mn_{0.01}Hg_{0.04}Cd_{0.95}Te$, $Mn_{0.01}Hg_{0.1}Cd_{0.89}Te$, $Mn_{0.12}Hg_{0.17}Cd_{0.71}Te$, and $Mn_{0.25}Hg_{0.04}Cd_{0.71}Te$.
This renders the magnetooptical element suitable for use in a wavelength range between 0.8 micrometer and 1.1 micrometers.

12 Claims, 4 Drawing Sheets

MAGNETOOPTICAL ELEMENT

TECHNICAL FIELD

This invention relates to a magnetooptical element for use as an optical isolator in an optical amplifier or the like and, more particularly, to a magnetooptical element which is suitable for use in a wavelength range between 0.8 micrometer and 1.1-micrometers. This invention relates furthermore to an optical isolator in which the magnetooptical element is used as a Faraday rotator.

BACKGROUND ART

A travelling-wave optical amplifier of a 1.5-micrometer band with an Er (erbium) added optical fibre has a high efficiency, no polarization dependency, and an excellent feature of match with a transmission system. Its practical application to excitation of laser diodes (hereafter LD) of a 0.98-micrometer and 1.48-micrometer bands has vigorously been studied. As a result of experimental studies of signal-to-optical gain and noise characteristics, it is already known that higher-efficiency and lower-noise characteristics are achieved by the excitation in the 0.98-micrometer band than the excitation in the 1.48-micrometer band. Development is, however, currently in progress as regards an optical amplifier comprising an optical device (as, for example, an optical isolator) suitable in the 1.48-micrometer band.

As a 0.98-micrometer optical isolator, optical isolators are in practical use at present with use of a terbium-gallium-garnet (TGG) single crystal. They are too bulky as compared with an LD and are not studied for future points of view. Bulk yttrium-iron-garnet (YIG) and Bi-substituted garnet are highly absorbing at the 0.98-micrometer band and are not practical because of an insertion loss of about 5 dB. It has been confirmed that $Cd_{1-x}Mn_xTe$ is a material having a great Verdet constant and is confirmed to exhibit a practical performance as a material for optical isolators of visible wavelengths of 0.85 to 0.63 micrometer when Mn is substituted for a part of Cd of CdTe of a ZnS crystal structure (Onodera and Oikawa, the 15-th Scientific Lecture Proceedings of the Applied Magnetism Institute of Japan, 30aB-7, page 179 (1991)).

The Verdet constant is, however, too small at 0.98 micrometer and has made it difficult to use in practice. This has been a main reason of a delay in development of an optical isolator for 0.98-micrometer band excitation of LD-moduled optical amplifier despite its intrinsically higher efficiency and lower noise characteristics than 1.48-micrometer band excitation.

It is therefore an object of this invention to provide a magnetooptical element suitable for use in a wavelength range between 0.8 micrometer and 1.1 micrometers (above all, 0.98 micrometer).

It is another object of this invention to provide an optical isolator in which use is made as a Faraday rotator of the magnetooptical element of the type described.

DISCLOSURE OF THE INVENTION

According to a first aspect of this invention, there is provided a magnetooptical element which comprises a single crystal of $Cd_{1-x-y}Mn_xHg_yTe$ including Mn and Hg and which is charaterized in that so as to be operable in a wavelength range between 0.8 micrometer and 1.1 micrometers the single crystal has a composition in an area defined in a quasi three-element phase diagram of MnTe—HgTe—CdTe by four points of:

$Mn_{0.01}Hg_{0.04}Cd_{0.95}Te$, $Mn_{0.01}Hg_{0.1}Cd_{0.89}Te$, $Mn_{0.12}Hg_{0.17}Cd_{0.71}Te$, and $Mn_{0.25}Hg_{0.04}Cd_{0.71}Te$.

According to a second aspect of this invention, there is provided a magnetooptical element which comprises a single crystal of $Cd_{1-x-y}Mn_xHg_yTe$ including Mn and Hg and which is characterized in that so as to be operable in a wavelength range between 0.8 micrometer and 1.1 micrometers the single crystal has a composition in an area defined in a quasi three-element phase diagram of MnTe—HgTe—CdTe by four points of:

$Mn_{0.41}Hg_{0.1}Cd_{0.49}Te$, $Mn_{0.41}Hg_{0.2}Cd_{0.39}Te$, $Mn_{0.45}Hg_{0.25}Cd_{0.3}Te$, and $Mn_{0.48}Hg_{0.2}Cd_{0.32}Te$.

According to this invention, there is furthermore provided an optical isolator characterized in that use is made as a Faraday rotator of the magnetooptical element according to the above-recited first or second aspects.

In the manner described above, $Cd_{1-x}Mn_xTe$ is a material having a great Verdet constant and is confirmed to exhibit a practical performance as optical isolators of visible wavelengths of 0.85 to 0.63 micrometer when Mn is substituted for a part of Cd of CdTe of a ZnS crystal structure. The practical performance has, however, not been attained in a 0.98-micrometer band due to small Verdet constant. This is because the Verdet constant has a tendency of growing large near an optical absorption edge. It is therefore studied in order to achieve the practical performance with this material to adjust bandgap energy of the material and to select an Mn composition for growing the Verdet constant large. It is possible to shift the bandgap energy to a 0.9-micrometer band by substituting Hg for a part of Cd. Bulk crystallinity has an eventually great influence. Crystal composition is consequently decided in compromise with the crystallinity.

With the magnetooptical element according to the first or the second aspect, it is possible to provide a 0.98-micrometer band optical isolator which has practical characteristics of at least 30-dB isolation and at most 1-dB insertion loss and is usable as an LD module.

According to a third aspect of this invention, there is provided a magnetooptical element which comprises a single crystal of $Cd_{1-x-y}Mn_xHg_yTe$ including Mn and Hg and which is characterized in that so as to be operable in a wavelength range between 0.8 and 1.1 micrometers the single crystal has a composition in an area defined in a quasi three-element phase diagram of MnTe—HgTe—CdTe by six points of:

$Mn_{0.2}Hg_{0.3}Cd_{0.5}Te$, $Mn_{0.3}Hg_{0.2}Cd_{0.5}Te$, $Mn_{0.30}Hg_{0.05}Cd_{0.65}Te$, $Mn_{0.15}Hg_{0.05}Cd_{0.80}Te$, $Mn_{0.10}Hg_{0.05}Cd_{0.85}Te$, and $Mn_{0.10}Hg_{0.25}Cd_{0.65}Te$, and that the single crystal is doped with at least one member selected from a group consisting of Se and S (hereinafter refferred to as Q) to a predetermined concentration range. Preferably, the concentration range of doping with Q is in $(Cd_{1-x-y}Mn_xHg_y)Q_zTe_{1-z}$:

$0.01 \leq z \leq 0.10$, where Q represents the above-mentioned at least one member selected from the group.

According to this invention, there is additionally provided an optical isolator characterized in that use is made as a Faraday rotator of the magnetooptical element according to the third aspect.

According to a fourth aspect of this invention, there is provided a magnetooptical element which comprises a single crystal of $Cd_{1-x-y}Mn_xHg_yTe$ including Mn and Hg and which is characterized in that so as to be operable in a wavelength range between 0.8 and 1.1 micrometers the single crystal has a composition in an area defined in a quasi three-element phase diagram of MnTe—HgTe—CdTe by six points of:

$Mn_{0.2}Hg_{0.3}Cd_{0.5}Te$, $Mn_{0.3}Hg_{0.2}Cd_{0.5}Te$,
$Mn_{0.30}Hg_{0.05}Cd_{0.65}Te$, $Mn_{0.15}Hg_{0.05}Cd_{0.80}Te$,
$Mn_{0.10}Hg_{0.05}Cd_{0.85}Te$, and $Mn_{0.10}Hg_{0.25}Cd_{0.65}Te$, and that the single crystal is doped with Zn to a predetermined concentration range. Preferably, the concentration range of doping with Zn is in $(Cd_{1-x-y}Mn_xHg_y)_{1-z}Zn_zTe$:

$0.01 \leq z \leq 0.10$.

According to this invention, there is further additionally provided an optical isolator characterized in that use is made as a Faraday rotator of the magnetooptical element according to the fourth aspect.

In the magnetooptical elements according to the third and the fourth aspects, Mn content is selected with a view towards achieving a practical performance with this material to adjust bandgap energy of the material and to make the Verdet coefficient have a great absolute value. Hg is substituted for a part of Cd to achieve a shift to a wavelength band where bandgap energy is necessary. A small quantity of Q or Zn is added to compensate for softening of the material by addition of a high concentration ($x \geq 0.1$) of Mn for a great Verdet coefficient and to raise a hardness of the crystal. These are strongly influenced by bulk crystallinity. Optimum crystal composition is therefore decided as a balance between feasibility of crystal manufacture and the crystallinity.

EMBODIMENTS OF THE INVENTION

Figure 1:
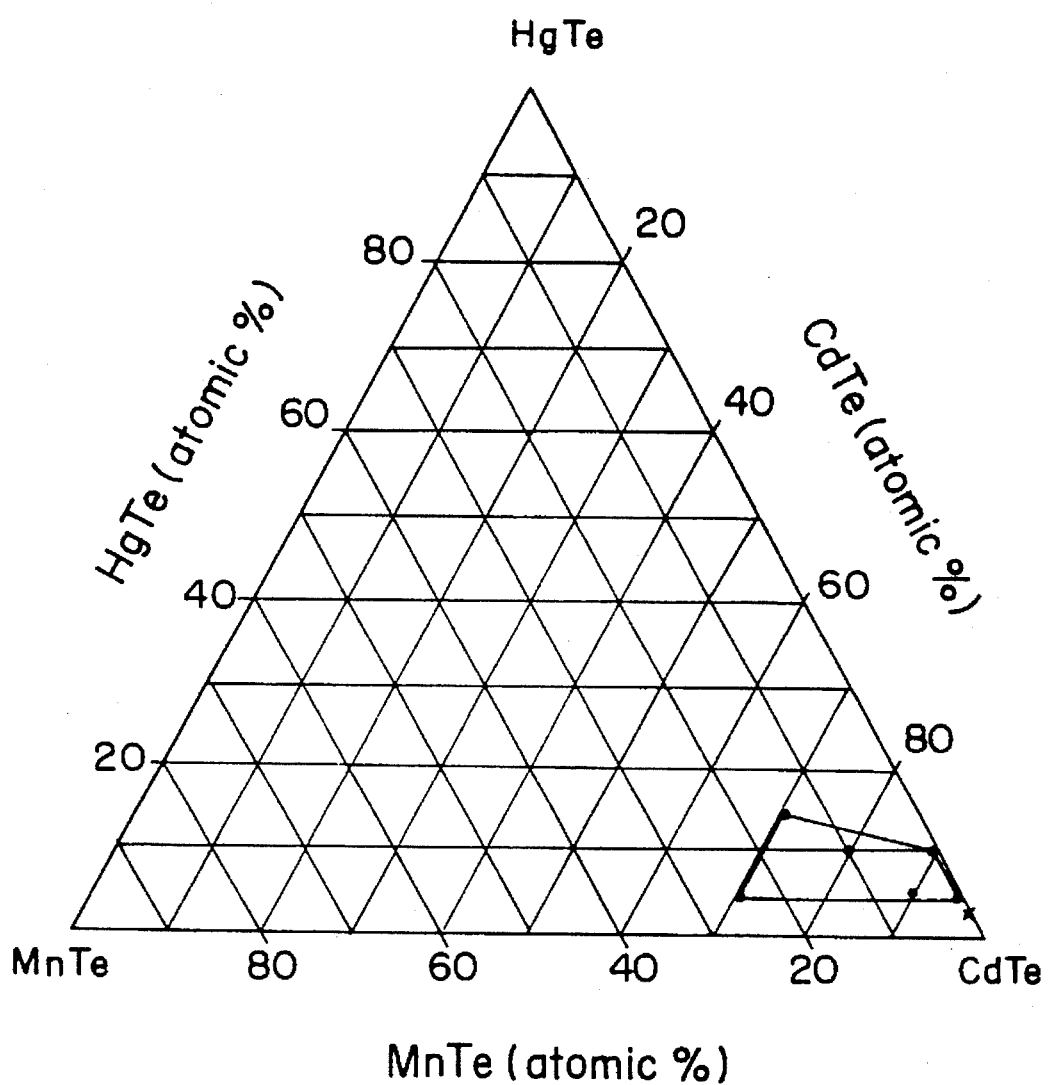
FIG. 1 shows in an MnTe—HgTe—CdTe quasi three-element phase diagram a crystal composition of a magnetooptical element which is according to a first embodiment of this invention and is exploitable in an optical isolator implementable as an LD module.

Embodiments of this invention will now be described with reference to the drawing.
(First Embodiment)

First described will be selection of an optimum composition of a magnetooptical element according to a first embodiment of this invention.

Crystals were manufactured by the Bridgman technique with various compositions in an MnTe—HgTe—CdTe quasi three-element phase diagram. Cd, Mn, Te, and Hg were mixed with the respective compositions in a quartz ampule and vacuum sealed. If complete melt is not attained during heating, the quartz ampule is possibly broken due to a high vapour pressure. A countermeasure was therefore resorted to, to make the quartz ampule have a sufficiently thick wall and to use an excess Te content for lowering the melting point to about 800° C. and for reduction of an internal pressure during growth.

The quartz ampule was placed in an upright Bridgman furnace and held at a melting temperature of 800° C. for ten hours. Thereafter, a quartz crucible was slowly lowered for crystallization from a lower temperature end of the quartz ampule.

FIG. 1 shows a composition of a magnetooptical element which is according to the first embodiment of this invention and is exploitable in an optical isolator (9.5×10 mm in diameter and in length) implemented as an LD module with an isolation of at least 30 dB and an insertion loss of at most 1 dB when supplied with an applied magnetic field of 3,000 Oe. In the manner depicted in FIG. 1, the magnetooptical element of the first embodiment of this invention comprises a $Cd_{1-x-y}Mn_xHg_yTe$ single crystal which has a composition in an area defined in a quasi three-element phase diagram of MnTe—HgTe—CdTe by four points of:

$Mn_{0.01}Hg_{0.04}Cd_{0.95}Te$, $Mn_{0.01}Hg_{0.1}Cd_{0.89}Te$,
$Mn_{0.12}Hg_{0.17}Cd_{0.71}Te$, and $Mn_{0.25}Hg_{0.04}Cd_{0.71}Te$.

Compared with segregation coefficients of other elements, Hg has a widely greater segregation coefficient. This results in much segregation in the composition and gives rise to fluctuations in characteristics of manufactured single crystals and to a poor yield, when an Hg content is greater than 0.17. On the other hand, an Mn content of greater than 0.25 often results in production of twin defects and in a poor yield.

An optical isolator was manufactured by using as its Faraday rotator the magnetooptical element according to the first embodiment of this invention. It was possible to implement the optical isolator as an LD module.

Examples will next be described as regards the magnetooptical element according to the first embodiment of this invention.

EXAMPLE 1

By the Bridgman technique, grown was a single crystal of a composition of $Mn_{0.1}Hg_{0.1}Cd_{0.8}Te$ at a low melting temperature (800° C.) by melt with excess Te. The growth was carried out as described before. From the single crystal thus grown, samples were manufactured in a rectangular plate shape of 2 mm×2 mm×1.7 mm in thickness and with (111) surfaces used as facets. It has been confirmed that a Faraday rotation of 45° was attained for a laser beam of a wavelength of 0.98 micrometer by application of a magnetic field of 3,000 Oe and that an optical isolator was satisfactorily exploitable to have an isolator size of 8×5 mm in diameter and length, a 30-dB isolation, and a 0.7-dB insertion loss.

EXAMPLE 2

By the Bridgman technique, grown was a single crystal of a composition of $Mn_{0.05}Hg_{0.05}Cd_{0.9}Te$ at a low melting temperature (850° C.) by melt with excess Te. The growth was carried out as described before. From the single crystal thus grown, samples were manufactured in a rectangular plate shape of 2 mm×2 mm×2.5 mm with (111) surfaces used as facets. It has been confirmed that a Faraday rotation of 45° was attained for a laser beam of a wavelength of 0.98 micrometer with application of a magnetic field of 5,000 Oe and that an optical isolator was satisfactorily exploitable to have a size of 13×10 mm in diameter and length, a 30-dB isolation, and a 0.7-dB insertion loss, which is more or less bulky for application to a laser diode.

Reference

By the Bridgman technique, grown was a single crystal of a composition of $Mn_{0.03}Hg_{0.00}Cd_{0.97}Te$ at a low melt (1,000° C.) by melt with excess Te. The growth was carried out as described before. From the single crystal thus grown, samples were manufactured in a rectangular plate shape of 2 mm×2 mm×7.0 mm and with (111) surfaces used as facets. With application of a magnetic field of 5,000 Oe, the Faraday rotation was 45° for a laser beam of a wavelength of 0.98 micrometer. An optical isolator had a size of 13×15 mm in diameter and length, a 25-dB isolation, and a 1.0-dB insertion loss to have an insufficient performance in application and to be bulky in practice as compared with a laser diode.

In this manner, it is possible with the first embodiment of this invention to provide a magnetooptical element which is suitable in an optical isolator for a wavelength range between 0.8 and 1.1 micrometers.

(Second Embodiment)

Selection of an optimum composition will now be described as regards a magnetooptical element according to a second embodiment of this invention.

Crystals were manufactured by the Bridgman technique with various compositions in an MnTe—HgTe—CdTe quasi three-element phase diagram. Cd, Mn, Te, and Hg were mixed with the respective compositions in a quartz ampule and vacuum sealed. If complete melt is not attained during heating, the quartz ampule is possibly broken due to a high vapour pressure. A countermeasure was therefore resorted to, to make the quartz ampule have a sufficiently thick wall and to use an excess Te content for lowering the melting point to about 800° C. and for reduction of an internal pressure during growth.

The quartz ampule was placed in an upright Bridgman furnace and held at a melting temperature of 800° C. for ten hours. Thereafter, a quartz crucible was slowly lowered for crystallization from a lower temperature end of the quartz ampule.

Figure 2:
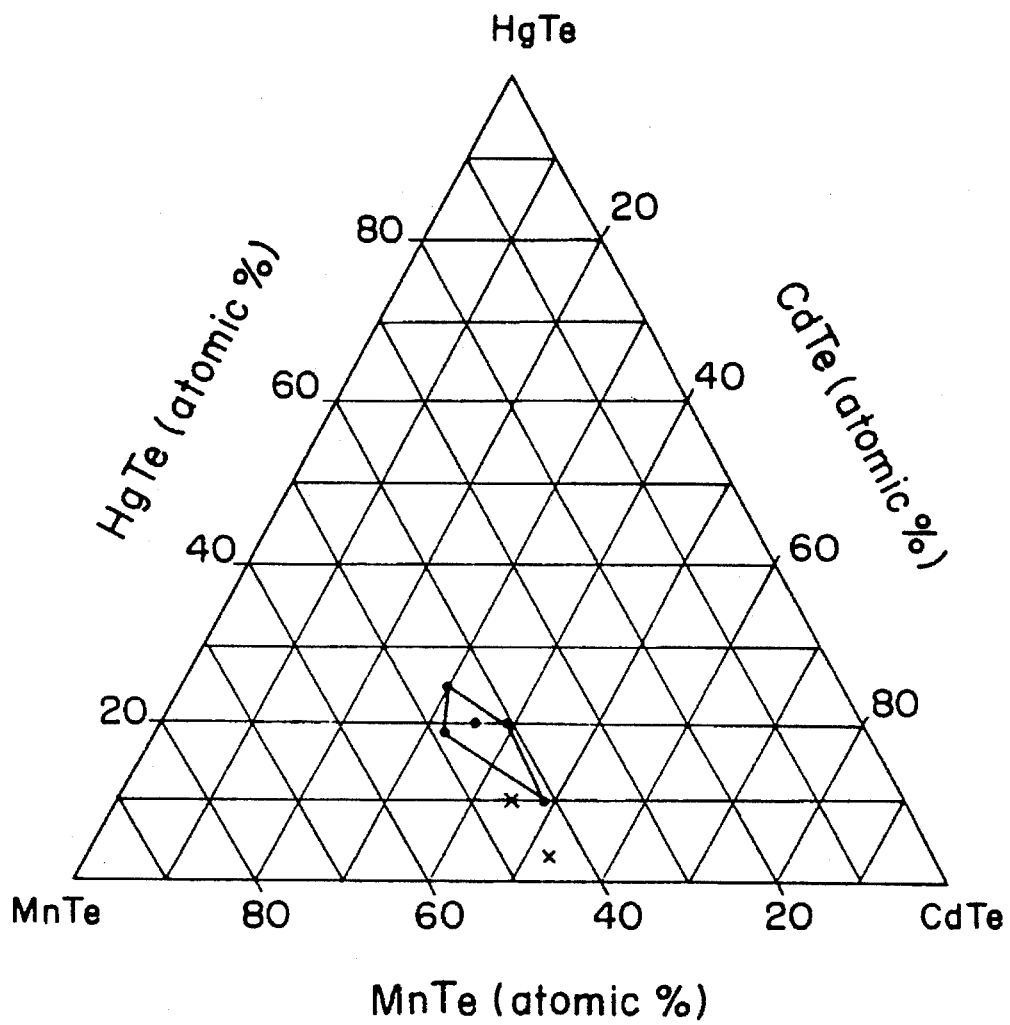
FIG. 2 shows in an MnTe—HgTe—CdTe quasi three-element phase diagram a crystal composition of a magnetooptical element which is according to a second embodiment of this invention and is exploitable in an optical isolator implementable as an LD module.

FIG. 2 shows a composition of a magnetooptical element which is according to the second embodiment of this invention and is exploitable in an optical isolator (9.5×10 mm in diameter and length) implemented as an LD module with an isolation of at least 30 dB and an insertion loss of at most 1 dB when applied with an applied magnetic field of 3,000 Oe. In the manner depicted in FIG. 2, the magnetooptical element of the second embodiment of this invention comprises a $Cd_{1-x-y}Mn_xHg_yTe$ single crystal which has a composition in an area defined in a quasi three-element phase diagram of MnTe—HgTe—CdTe by four points of:

$Mn_{0.41}Hg_{0.1}Cd_{0.49}Te$, $Mn_{0.41}Hg_{0.2}Cd_{0.39}Te$, $Mn_{0.45}Hg_{0.25}Cd_{0.3}Te$, and $Mn_{0.48}Hg_{0.2}Cd_{0.32}Te$.

When use was made as a Faraday rotator of the magnetooptical element according to the second embodiment of this invention, an optical isolator is an optical isolator implemented as an LD module.

Figure 3:
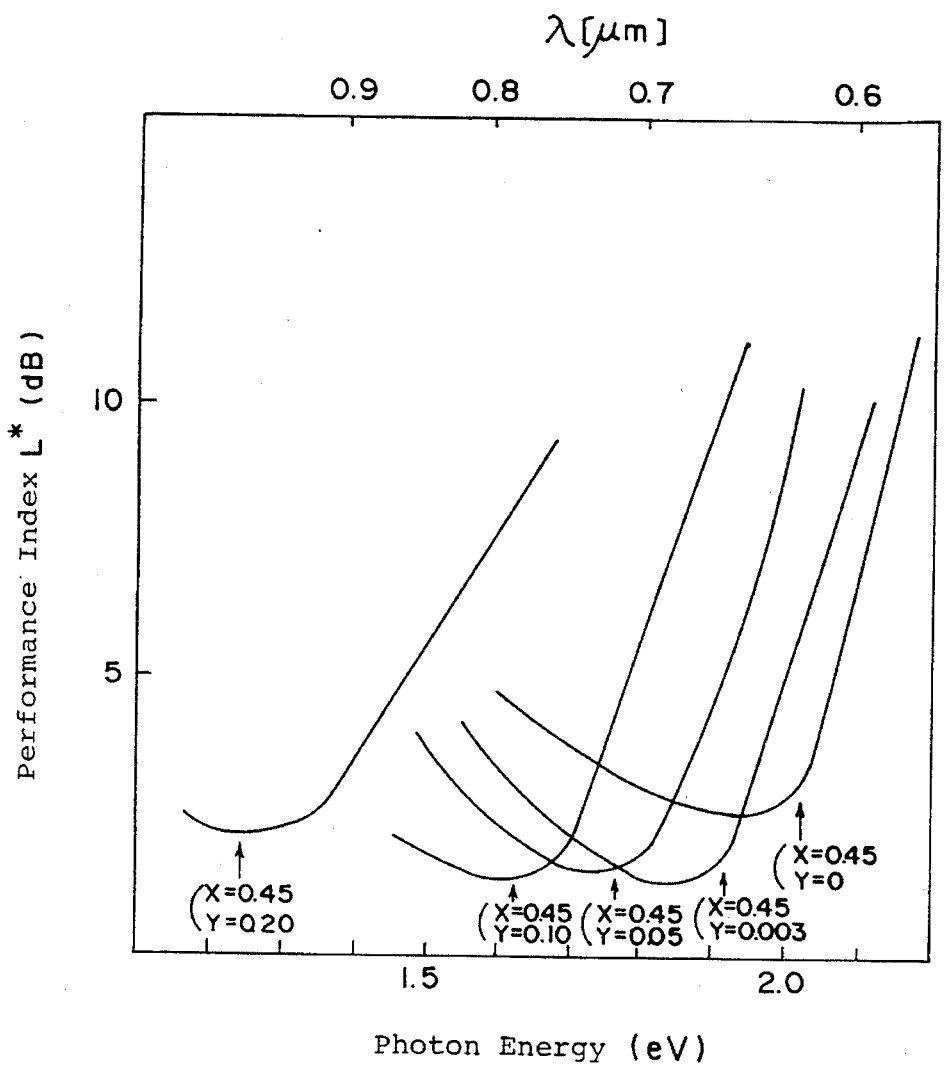
FIG. 3 shows a performance index L* for dispersion in wavelengths λ with an amount of doping with Hg varied in a variable concentration of Mn.

FIG. 3 shows a performance index L* for dispersion in wavelengths λ with an amount of doping with Hg varied in a variable content of Mn, where:

$L^* = (450/\ln 10)(\alpha/\theta_F)$, where in turn α represents an absorption constant and $\theta_F$, an angle of Faraday rotation when a magnetic field H of 5,000 Oe is applied, x representing an Mn concentration and y, an Hg concentration.

Examples will next be described as regards the magnetooptical element according to the second embodiment of this invention.

Example

By the Bridgman technique, grown was a single crystal of a composition of $Mn_{0.45}Hg_{0.2}Cd_{0.35}Te$ at a low melting temperature (800° C.) by melt with excess Te. The growth was carried out as described above. From the single crystal thus grown, samples were manufactured in a rectangular plate shape of 2 mm×2 mm×1.7 mm in thickness and with (111) surfaces used as facets. It has been confirmed that a Faraday rotation of 45° was attained for a laser beam of a wavelength of 0.98 micrometer by application of a magnetic field of 3,000 Oe and that an optical isolator was satisfactorily exploitable to have an isolator size of 8×5 mm in diameter and length, a 30-dB isolation, and a 0.7-dB insertion loss.

Reference 1

By the Bridgman technique, grown was a single crystal of a composition of $Mn_{0.45}Hg_{0.1}Cd_{0.45}Te$ at a low melting temperature (850° C.) by melt with excess Te. The growth was carried out as described above. From the single crystal thus grown, samples were manufactured in a rectangular plate shape of 2 mm×2 mm×7.0 mm and with (111) surfaces used as facets. With application of a magnetic field of 5,000 Oe, the Faraday rotation was 45° for a laser beam of a wavelength of 0.98 micrometer. An optical isolator had a size of 13×15 mm in diameter and length, a 25-dB isolation, and a 1.0-dB insertion loss. In performance, the isolation was as low as 25 dB. In practice, it was more or less bulky when compared with a laser diode.

Reference 2

By the Bridgman technique, grown was a single crystal of a composition of $Mn_{0.45}Hg_{0.03}Cd_{0.52}Te$ at a low melt (970° C.) by melt with excess Te. The growth was carried out as described above. From the single crystal thus grown, samples were manufactured in a rectangular plate shape of 2 mm×2 mm×10 mm and with (111) surfaces used as facets. With application of a magnetic field of 5,000 Oe, a Faraday rotation was 45° for a laser beam of a wavelength of 0.98 micrometer. An optical isolator had a size of 13×20 mm in diameter and length, a 20-dB isolation, and a 1.3-dB insertion loss to have an insufficient performance in application.

In this manner, it is possible with the second embodiment of this invention to provide a magnetooptical element which is suitable in an optical isolator for a wavelength range between 0.8 and 1.1 micrometers.

(Third Embodiment)

Selection of an optimum composition will now be described as regards a magnetooptical element according to a third embodiment of this invention.

Crystals were manufactured by the Bridgman technique with various compositions in an MnTe—HgTe—CdTe—QTe quasi four-element phase diagram, where Q represents at least one member selected from a group consisting of Se and S. Cd, Mn, Te, Hg, and Q were mixed with the respective compositions in a quartz ampule and vacuum sealed. If complete melt is not attained during heating, the quartz ampule is possibly broken due to a high vapour pressure. A countermeasure was therefore resorted to, to make the quartz ampule have a sufficiently thick wall and to use an excess Te content for lowering the melting point to about 800° C. and for reduction of an internal pressure during growth.

The quartz ampule was placed in an upright Bridgman furnace and held at a melting temperature of 800° C. for ten hours. Thereafter, a quartz crucible was slowly lowered for crystallization from a lower temperature end of the quartz ampule.

Figure 4:
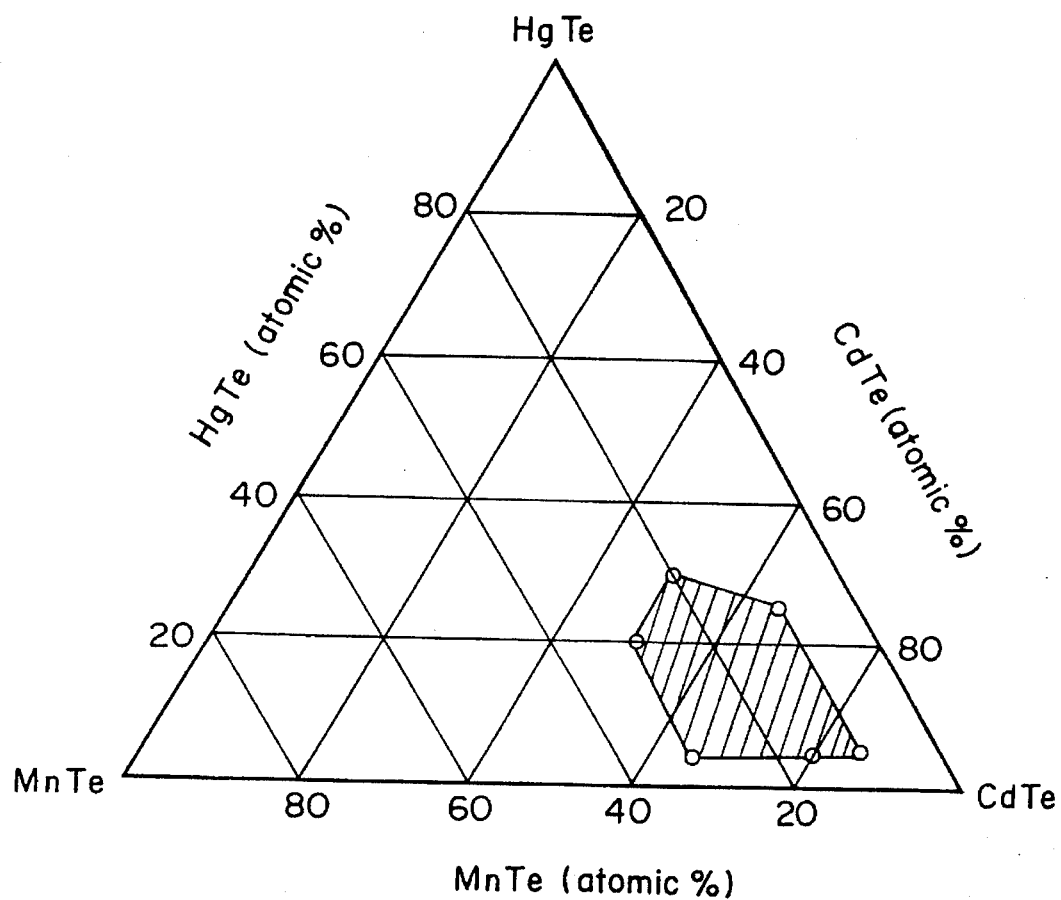
FIG. 4 shows an MnTe—HgTe—CdTe quasi three-element phase diagram crystal compositions of magnetooptical elements which are according to third and fourth embodiments of this invention and are exploitable in an optical isolator implementable as an LD module.

FIG. 4 shows a composition of a magnetooptical element which is according to the third embodiment of this invention and is exploitable in an optical isolator (9.5×10 mm in diameter and length) implemented as an LD module with an isolation of at least 30 dB and an insertion loss of at most 1 dB when applied with an applied magnetic field of 3,000 Oe. In the manner depicted in FIG. 4, the magnetooptical element of the third embodiment of this invention comprises a single crystal of a composition which is in an area defined in a quasi three-element phase diagram of MnTe—HgTe—CdTe by six points of:

$Mn_{0.10}Hg_{0.05}Cd_{0.85}Te$, and $Mn_{0.10}Hg_{0.25}Cd_{0.65}Te$, and is doped to a predetermined concentration range by at east one member Q selected from a group consisting of Se and S. The predetermined concentration range of dope with Q is in $(Cd_{1-x-y}Mn_xHg_y)Q_zTe_{1-z}$:

$$0.01 \leq z \leq 0.10.$$

When use was made as a Faraday rotator of the magnetooptical element according to the third embodiment of this invention, an optical isolator is an optical isolator implemented as an LD module.

Examples will now be described wherein Se is used as Q.

EXAMPLE 1

By the Bridgman technique, grown was a single crystal of a composition of $(Mn_{0.2}Hg_{0.3}Cd_{0.5})Se_{0.10}Te_{0.09}$ at a low melting temperature (800° C.) by melt with excess Te. The growth was carried out as described above. From the single crystal thus grown, samples were manufactured in a rectangular plate shape of 2 mm×2 mm×1.7 mm and with (111) surfaces used as facets. It has been confirmed that a Faraday rotation of 45° was attained for a laser beam of a wavelength of 1.02 micrometers by application of a magnetic field of 3,000 Oe and that an optical isolator was satisfactorily exploitable to have a size of 8×5 mm in diameter and length, a 30-dB isolation, and a 0.7-dB insertion loss.

EXAMPLE 2

By the Bridgman technique, grown was a single crystal of a composition of $(Mn_{0.10}Hg_{0.25}Cd_{0.65})Se_{0.05}Te_{0.95}$ at a low melting temperature (800° C.) by melt with excess Te. The growth and the shape and crystal faces of the samples of the grown were similar to those in Example 1. Application of the magnetic field of 3,000 Oe showed similar results as in Example 1, with confirmation of satisfactory use as an optical isolator of an isolator size of 8×5 mm in diameter and length.

EXAMPLE 3

By the Bridgman technique, grown was a single crystal of a composition of $(Mn_{0.3}Hg_{0.2}Cd_{0.5})Se_{0.05}Te_{0.95}$ at a low melting temperature (800° C.) by melt with excess Te. The growth and the shape and crystal faces of the samples of the grown were similar to those in Example 1. Application of the magnetic field of 3,000 Oe showed similar results as in Example 2, with confirmation of satisfactory use as an optical isolator of an isolator size of 8×5 mm in diameter and length.

EXAMPLE 4

By the Bridgman technique, grown was a single crystal of a composition of $(Mn_{0.15}Hg_{0.05}Cd_{0.80})Se_{0.05}Te_{0.95}$ at a low melting temperature (800° C.) by melt with excess Te. The growth and the shape and crystal faces of the samples of the grown were similar to those in Example 1. Application of the magnetic field of 3,000 Oe showed similar results as in Example 3, with confirmation of satisfactory use as an optical isolator of an isolator size of 8×5 mm in diameter and length.

Reference 1

By the Bridgman technique, grown was a single crystal of a composition of $(Mn_{0.2}Hg_{0.3}Cd_{0.5})Se_{0.20}Te_{0.80}$ at a low melting temperature (800° C.) by melt with excess Te. The growth and the shape and crystal faces of the samples of the grown were similar to those in Example 1. Application of the magnetic field of 3,000 Oe showed similar results as in Example 4 except for the isolator size. Satisfactory use was possible as an optical isolator of an isolator size of 16×5 mm in diameter and length. Insufficient was, however, for manufacture of an LD module.

Reference 2

By the Bridgman technique, grown was a single crystal of a composition of $(Mn_{0.10}Hg_{0.25}Cd_{0.65})Se_{0.15}Te_{0.85}$ at a low melting temperature (800° C.) by melt with excess Te. The growth and the shape and crystal faces of the samples of the grown were similar to those in Example 1. Application of the magnetic field of 3,000 Oe showed similar results as in Example 4 except for the isolator size. Satisfactory use was possible as an optical isolator of an isolator size of 16×5 mm in diameter and length. Insufficient was, however, for manufacture of an LD module.

Reasons are as follows why the concentration range of Se was specified as:

$$0.01 \leq z \leq 0.10.$$

Use of 0.1 or greater for z cancels an effect of substitution by Hg to increase the Verdet constant by a shift of the absorption edge towards a longer wavelength (substitution by Se shifting the absorption edge towards a shorter wavelength to reduce the Verdet constant). With and without addition of Se, the crystal had a greater Vickers microhardness (in MPa) as listed in Table 1 in the following with substitution by Se than that with no substitution at all. This makes it possible to apply mechanical grinding to a grinding step with no strain and to solve the problems of transmitted wavefronts.

TABLE 1

| | |
|---|---|
| $Mn_{0.15}Hg_{0.13}Cd_{0.72}Te$: | 500 MPa |
| $(Mn_{0.15}Hg_{0.13}Cd_{0.72})Se_{0.09}Te_{0.91}$: | 950 MPa |

Examples will next be described wherein S is used as Q.

EXAMPLE 1

By the Bridgman technique, grown was a single crystal of a composition of $(Mn_{0.2}Hg_{0.3}Cd_{0.5})S_{0.10}Te_{0.90}$ at a low melting temperature (800° C.) by melt with excess Te. The growth was carried out as above. From the single crystal thus grown, samples were manufactured in a rectangular plate shape of 2 mm×2 mm×1.7 mm and with (111) surfaces used as facets. It has been confirmed that a Faraday rotation of 45° was attained for a laser beam of a wavelength of 1.02 micrometers by application of a magnetic field of 3,000 Oe and that an optical isolator was satisfactorily exploitable to have a size of 8×5 mm in diameter and length, a 30-B isolation, and a 0.7-dB insertion loss.

EXAMPLE 2

By the Bridgman technique, grown was a single crystal of a composition of $(Mn_{0.10}Hg_{0.25}Cd_{0.65})S_{0.05}Te_{0.95}$ at a low melting point (800° C.) by melt with excess Te. The growth and the shape and crystal faces of the samples of the grown were similar to those in Example 1. Application of the magnetic field of 3,000 Oe showed similar results as in Example 1, with confirmation of satisfactory use as an optical isolator of an isolator size of 8×5 mm in diameter and length.

EXAMPLE 3

By the Bridgman technique, grown was a single crystal of a composition of $(Mn_{0.3}Hg_{0.2}Cd_{0.5})S_{0.05}Te_{0.95}$ at a low melting temperature (800° C.) by melt with excess Te. The growth and the shape and crystal faces of the samples of the grown were similar to those in Example 1. Application of the magnetic field of 3,000 Oe showed similar results as in Example 2, with confirmation of satisfactory use as an optical isolator of an isolator size of 8×5 mm in diameter and length.

EXAMPLE 4

By the Bridgman technique, grown was a single crystal of a composition of $(Mn_{0.15}Hg_{0.05}Cd_{0.80})S_{0.05}Te_{0.95}$ at a low melting temperature (800° C.) by melt with excess Te. The growth and the shape and crystal faces of the samples of the grown were similar to those in Example 1. Application of the magnetic field of 3,000 Oe showed similar results as in Example 3, with confirmation of satisfactory use as an optical isolator of an isolator size of 8×5 mm in diameter and length.

Reference 1

By the Bridgman technique, grown was a single crystal of a composition of $(Mn_{0.2}Hg_{0.3}Cd_{0.5})S_{0.20}Te_{0.80}$ at a low melting temperature (800° C.) by melt with excess Te. The growth and the shape and crystal faces of the samples of the grown were similar to those in Example 1. Application of the magnetic field of 3,000 Oe showed similar results as in Example 4 except for the isolator size. Satisfactory use was possible as an optical isolator of an isolator size of 16×5 mm in diameter and length. Insufficient was, however, for manufacture of an LD module.

Reference 2

By the Bridgman technique, grown was a single crystal of a composition of $(Mn_{0.10}Hg_{0.25}Cd_{0.65})S_{0.15}Te_{0.85}$ at a low melting temperature (800° C.) by melt with excess Te. The growth and the shape and crystal faces of the samples of the grown were similar to those in Example 1. Application of the magnetic field of 3,000 Oe showed similar results as in Example 3, except for the isolator size. Satisfactory use was possible as an optical isolator of an isolator size of 16×5 mm in diameter and length. Insufficient was, however, for manufacture of an LD module.

Reasons are as follows why the concentration range of S was specified as:

$$0.01 \leq z \leq 0.10.$$

Use of 0.1 or greater for z negates an effect of substitution by Hg to increase the Verdet constant by a shift of the absorption edge towards a longer wavelength (substitution by S shifting the absorption edge towards a shorter wavelength to reduce the Verdet constant). With and without addition of S, the crystal had a greater Vickers microhardness (in MPa) as listed in Table 2 in the following with substitution by S and with no substitution at all. This makes it possible to apply mechanical grinding to a grinding step with no strain and to solve the problems of transmitted wavefronts.

TABLE 2

| | |
|---|---|
| $Mn_{0.15}Hg_{0.13}Cd_{0.72}Te$: | 500 MPa |
| $(Mn_{0.15}Hg_{0.13}Cd_{0.72})S_{0.09}Te_{0.91}$: | 850 MPa |

(Fourth Embodiment)

Selection of an optimum composition will now be described as regards a magnetooptical element according to a fourth embodiment of this invention.

Crystals were manufactured by the Bridgman technique with various compositions in an MnTe—HgTe—CdTe—ZnTe quasi four-element phase diagram. Cd, Mn, Te, Hg, and Zn were mixed with the respective compositions in a quartz ampule and vacuum sealed. If complete melt is not attained during heating, the quartz ampule is possibly broken due to a high vapour pressure. A countermeasure is therefore resorted to, to make the quartz ampule have a sufficiently thick wall and to use an excess Te content for lowering the melting point to about 800° C. and for reduction of an internal pressure during growth.

The quartz ampule was placed in an upright Bridgman furnace and held at a melting temperature of 800° C. for ten hours. Thereafter, a quartz crucible was slowly lowered for crystallization from a lower temperature end of the quartz ampule.

FIG. 4 shows a composition of a magnetooptical element which is according to the fourth embodiment of this invention and is exploitable in an optical isolator (9.5×10 mm in diameter and length) implemented as an LD module with an isolation of at least 30 dB and an insertion loss of at most 1 dB when applied with an applied magnetic field of 3,000 Oe. In the manner shown in FIG. 4, the magnetooptical element of the fourth embodiment of this invention comprises a single crystal of a composition which is in an area defined in a quasi three-element phase diagram of MnTe—HgTe—CdTe by six points of:

$Mn_{0.2}Hg_{0.3}Cd_{0.5}Te$, $Mn_{0.3}Hg_{0.2}Cd_{0.5}Te$,
$Mn_{0.30}Hg_{0.05}Cd_{0.65}Te$, $Mn_{0.15}Hg_{0.05}Cd_{0.80}Te$,
$Mn_{0.10}Hg_{0.05}Cd_{0.85}Te$, and $Mn_{0.10}Hg_{0.25}Cd_{0.65}Te$, and is doped to a predetermined concentration range by Zn. The predetermined range of dope with Zn is in $(Cd_{1-x-y}Mn_xHg_y)_{1-z}Zn_zTe$:

$$0.01 \leq z \leq 0.10.$$

When use was made as a Faraday rotator of the magnetooptical element according to the fourth embodiment of this invention, an optical isolator is an optical isolator implemented as an LD module.

Examples will now be described wherein Zn is doped.

EXAMPLE 1

By the Bridgman technique, grown was a single crystal of a composition of $Mn_{0.19}Hg_{0.28}Cd_{0.48}Zn_{0.05}Te$ at a low melting temperature (800° C.) by melt with excess Te. The growth was carried out as above. From the single crystal thus grown, samples were manufactured in a rectangular plate shape of 2 mm×2 mm×1.7 mm and with (111) surfaces used as facets. It has been confirmed that a Faraday rotation of 45° was attained for a laser beam of a wavelength of 1.02 micrometers by application of a magnetic field of 3,000 Oe and that an optical isolator was satisfactorily exploitable to have a size of 8×5 mm in diameter and length, a 30-dB isolation, and a 0.7-dB insertion loss.

EXAMPLE 2

By the Bridgman technique, grown was a single crystal of a composition of $Mn_{0.27}Hg_{0.18}Cd_{0.45}Zn_{0.10}Te$ at a low melting temperature (800° C.) by melt with excess Te. The growth and the shape and crystal faces of the samples of the grown were similar to those in Example 1. Application of the magnetic field of 3,000 Oe showed similar results as in Example 1, with confirmation of satisfactory use as an optical isolator of an isolator size of 8×5 mm in diameter and length.

EXAMPLE 3

By the Bridgman technique, grown was a single crystal of a composition of $Mn_{0.28}Hg_{0.05}Cd_{0.62}Zn_{0.05}Te$ at a low melting temperature (800° C.) by melt with excess Te. The growth and the shape and crystal faces of the samples of the grown were similar to those in Example 1. Application of the magnetic field of 3,000 Oe showed similar results as in Example 2, with confirmation of satisfactory use as an optical isolator of an isolator size of 8×5 mm in diameter and length.

EXAMPLE 4

By the Bridgman technique, grown was a single crystal of a composition of $Mn_{0.14}Hg_{0.05}Cd_{0.76}Zn_{0.05}Te$ at a low melting temperature (800° C.) by melt with excess Te. The growth and the shape and crystal faces of the samples of the grown were similar to those in Example 1. Application of the magnetic field of 3,000 Oe showed similar results as in Example 3, with confirmation of satisfactory use as an optical isolator of an isolator size of 8×5 mm in diameter and length.

Reference 1

By the Bridgman technique, grown was a single crystal of a composition of $Mn_{0.15}Hg_{0.20}Cd_{0.45}Zn_{0.20}Te$ at a low melting temperature (800° C.) by melt with excess Te. The growth and the shape and crystal faces of the samples of the grown were similar to those in Example 1. Application of the magnetic field of 3,000 Oe showed similar results as in Example 4 except for the isolator size. Satisfactory use was possible as an optical isolator of an isolator size of 16×5 mm in diameter and length. Insufficient was, however, for manufacture of an LD module.

Reference 2

By the Bridgman technique, grown was a single crystal of a composition of $Mn_{0.30}Hg_{0.10}Cd_{0.45}Zn_{0.15}Te$ at a low melting temperature (800° C.) by melt with excess Te. The growth and the shape and crystal faces of the samples of the grown were similar to those in Example 1. Application of the magnetic field of 3,000 Oe showed similar results as in Example 4 except for the isolator size. Satisfactory use was possible as an optical isolator of an isolator size of 16×5 mm in diameter and length. Insufficient was, however, for manufacture of an LD module.

Reasons are as follows why the concentration range of Zn was specified as:

$0.01 \leq z \leq 0.10$.

Use of 0.1 or greater for z negates an effect of substitution by Hg to increase the Verdet coefficient by a shift of the absorption edge towards a longer wavelength (substitution by Zn shifting the absorption edge towards a shorter wavelength to reduce the Verdet constant). With and without addition of Zn, the crystal had a greater Vickers microhardness (in MPa) as listed in Table 3 in the following with substitution by Zn and with no substitution at all. This makes it possible to apply mechanical grinding to a grinding step with no strain and to solve the problems of transmitted wavefronts.

TABLE 3

| | |
|---|---|
| $Mn_{0.15}Hg_{0.13}Cd_{0.72}Te$: | 500 MPa |
| $Mn_{0.15}Hg_{0.13}Cd_{0.63}Zn_{0.09}Te$: | 1200 MPa |

With the magnetooptical elements according to the third and the fourth embodiments of this invention, it is possible to provide an optical isolator which has a great Verdet constant ($\geq 0.06$), a low insertion loss ($\leq 0.5$ dB per an optical length necessary to attain a 45° Faraday rotation), and transmitted wavefronts of a practical surface precision and is used in avoiding a returning beam either in an LD (0.9 to 1.1-micrometer band) for excitation of an optical amplifier or in a system for producing a single wavelength (blue laser) by exciting with an LD (0.8 to 0.9-micrometer band) an SHG crystal ($KNbO_3$, KTP, LN, or LT).

In this manner, it is possible with the embodiments of this invention to provide a magnetooptical element suitable for an optical isolator of a 0.8 to 1.1-micrometer wavelength region.

ADVANTAGEOUS EFFECTS

As thus far been described, it is possible with this invention to provide a magnetooptical element suitable for an optical isolator of a wavelength range between 0.8 and 1.1 micrometers and an optical isolator comprising such a magnetooptical element as a Faraday rotator.

I claim:

1. A magnetooptical element comprising a single crystal of $Cd_{1-x-y}Mn_xHg_yTe$ including Mn and Hg, characterized in that, so as to be operable in a wavelength range between 0.8 micrometer and 1.1 micrometers, said single crystal has a composition in an area defined in a quasi three-element phase diagram of MnTe—HgTe—CdTe by four points of:

$Mn_{0.01}Hg_{0.04}Cd_{0.95}Te$, $Mn_{0.01}Hg_{0.1}Cd_{0.89}Te$, $Mn_{0.12}Hg_{0.17}Cd_{0.71}Te$, and $Mn_{0.25}Hg_{0.04}Cd_{0.71}Te$.

2. An optical isolator characterized by a Faraday rotator which comprises the magnetooptical element as in claim 1 and means for applying a magnetic field to said magnetooptical element.

3. A magnetooptical element comprising a single crystal of $Cd_{1-x-y}Mn_xHg_y$Te including Mn and Hg, characterized in that, so as to be operable in a wavelength range between 0.8 micrometer and 1.1 micrometers, said single crystal has a composition in an area defined in a quasi three-element phase diagram of MnTe—HgTe—CdTe by four points of:

$Mn_{0.41}Hg_{0.1}Cd_{0.49}$Te, $Mn_{0.41}Hg_{0.2}Cd_{0.39}$Te, $Mn_{0.45}Hg_{0.25}Cd_{0.3}$Te, and $Mn_{0.48}Hg_{0.2}Cd_{0.32}$Te.

4. An optical isolator characterized by a Faraday rotator which comprises the magnetooptical element as in claim 3 and means for applying a magnetic field to said magnetooptical element.

5. A magnetooptical element comprising a single crystal of $Cd_{1-x-y}Mn_xHg_y$Te including Mn and Hg, characterized in that, so as to be operable in a wavelength range between 0.8 and 1.1 micrometers, said single crystal has a composition in an area defined in a quasi three-element phase diagram of MnTe—HgTe—CdTe by six points of:

$Mn_{0.2}Hg_{0.3}Cd_{0.5}$Te, $Mn_{0.3}Hg_{0.2}Cd_{0.5}$Te, $Mn_{0.30}Hg_{0.05}Cd_{0.65}$Te, $Mn_{0.15}Hg_{0.05}Cd_{0.80}$Te, $Mn_{0.10}Hg_{0.05}Cd_{0.85}$Te, and $Mn_{0.10}Hg_{0.25}Cd_{0.65}$Te, and that said single crystal is doped with at least one member selected from a group consisting of Se and S to a predetermined concentration range.

6. A magnetooptical element as claimed in claim 5, characterized in that said concentration range of doping with Q is specified in $(Cd_{1-x-y}Mn_xHg_y)Q_zTe_{1-z}$ by:

$$0.01 \leq z \leq 0.10,$$

where Q represents said at least one member selected from said group.

7. An optical isolator characterized by a Faraday rotator which comprises the magnetooptical element as in claim 6 and means for applying a magnetic field to said magnetooptical element.

8. An optical isolator characterized by a Faraday rotator which comprises the magnetooptical element as in claim 5 and means for applying a magnetic field to said magnetooptical element.

9. A magnetooptical element comprising a single crystal of $Cd_{1-x-y}Mn_xHg_y$Te including Mn and Hg, characterized in that, so as to be operable in a wavelength range between 0.8 and 1.1 micrometers, said single crystal has a composition in an area defined in a quasi three-element phase diagram of MnTe—HgTe—CdTe by six points of:

$Mn_{0.2}Hg_{0.3}Cd_{0.5}$Te, $Mn_{0.3}Hg_{0.2}Cd_{0.5}$Te, $Mn_{0.30}Hg_{0.05}Cd_{0.65}$Te, $Mn_{0.15}Hg_{0.05}Cd_{0.80}$Te, $Mn_{0.10}Hg_{0.05}Cd_{0.85}$Te, and $Mn_{0.10}Hg_{0.25}Cd_{0.65}$Te, and that said single crystal is doped with Zn to a predetermined concentration range.

10. A magnetooptical element as claimed in claim 9, characterized in that said concentration range of doping with Zn is defined in $(Cd_{1-x-y}Mn_xHg_y)_{1-z}Zn_z$Te by:

$$0.01 \leq z \leq 0.10.$$

11. An optical isolator characterized by a Faraday rotator which comprises the magnetooptical element as in claim 10 and means for applying a magnetic field to said magnetooptical element.

12. An optical isolator characterized by a Faraday rotator which comprises the magnetooptical element as in claim 9 and means for applying a magnetic field to said magnetooptical element.

* * * * *